US012698771B2

(12) United States Patent
Atobe et al.

(10) Patent No.: US 12,698,771 B2
(45) Date of Patent: Aug. 4, 2026

(54) COMPRESSOR

(71) Applicant: Carrier Japan Corporation, Tokyo (JP)

(72) Inventors: Shohei Atobe, Fuji (JP); Norihisa Watanabe, Fuji (JP)

(73) Assignee: Carrier Japan Corporation, Tokyo (JP)

(*) Notice: Subject to any disclaimer, the term of this patent is extended or adjusted under 35 U.S.C. 154(b) by 0 days.

(21) Appl. No.: 19/228,856

(22) Filed: Jun. 5, 2025

(65) Prior Publication Data

US 2025/0376981 A1 Dec. 11, 2025

(30) Foreign Application Priority Data

Jun. 10, 2024 (JP) ................................ 2024-093658

(51) Int. Cl.
*F04C 18/356* (2006.01)

(52) U.S. Cl.
CPC ...... *F04C 18/3564* (2013.01); *F04C 18/3562* (2013.01); *F04C 2230/91* (2013.01); *F04C 2240/20* (2013.01); *F05C 2201/0406* (2013.01); *F05C 2201/0412* (2013.01); *F05C 2203/083* (2013.01); *F05C 2203/0847* (2013.01); *F05C 2253/12* (2013.01)

(58) Field of Classification Search
CPC .............. F04C 18/3564; F04C 18/3562; F04C 2230/91; F04C 2240/20; F05C 2201/0406; F05C 2201/0412; F05C 2203/083; F05C 2203/0847; F05C 2253/12
See application file for complete search history.

(56) References Cited

U.S. PATENT DOCUMENTS 8,092,201 B2 * 1/2012 Tsukahara ............. F04C 2/3442 418/179
12,297,832 B2 * 5/2025 Watanabe ............. F25B 31/026
2011/0052439 A1 * 3/2011 Watanabe ............... F04B 39/00 418/178

FOREIGN PATENT DOCUMENTS

JP 2005-155459 A 6/2005
JP 6011861 B2 10/2016
WO WO-2023/032072 A1 3/2023

OTHER PUBLICATIONS

Extended European Search Report issued Oct. 13, 2025 in European Patent Application No. 25180167.6, 10 pages.

* cited by examiner

*Primary Examiner* — Charles G Freay
(74) *Attorney, Agent, or Firm* — Oblon, McClelland, Maier & Neustadt, L.L.P.

(57) ABSTRACT

A compressor of an embodiment includes a sealed container and a compression mechanism part configured to compress a refrigerant within the sealed container. The refrigerant is an unsaturated refrigerant or a mixed refrigerant containing an unsaturated refrigerant. The compression mechanism part contains chromium. The compression mechanism part includes a first member and a second member. The first member and the second member slide relative to each other. A blend layer containing chromium nitride and titanium nitride is formed on a surface of the first member. The titanium nitride in the blend layer is distributed such that a concentration of the titanium nitride increases and decreases regularly in a thickness direction of the blend layer. Carbide is precipitated on a surface of the second member.

12 Claims, 4 Drawing Sheets

COMPRESSOR

CROSS-REFERENCE TO RELATED APPLICATION

Priority is claimed on Japanese Patent Application No. 2024-093658, filed Jun. 10, 2024, the content of which is incorporated herein by reference.

BACKGROUND OF THE INVENTION

Field of the Invention

The present invention relates to a compressor.

Description of Related Art

Refrigeration cycle apparatuses such as air conditioners use a compressor such as a refrigerant compressor having a compression mechanism part configured to draw in and discharge a refrigerant serving as a working fluid. For example, heat is likely to be generated at sliding portions such as a distal end surface of a blade and an outer circumferential surface of a roller in the compressor. There is a concern that the refrigerant may be thermally decomposed due to the heat. There is a concern that products generated by the thermal decomposition of the refrigerant may lead to compressor failure.

Japanese Patent No. 6011861 (hereinafter, referred to as Patent Document) discloses that an antioxidant or the like is added to a refrigeration oil in order to suppress thermal decomposition of the refrigerant.

However, Patent Document only discusses the refrigeration oil for suppressing thermal decomposition of the refrigerant. Improving sliding components of the compressor for reducing heat generated by sliding is also important.

A main problem to be solved by the present invention is to provide a compressor capable of reducing heat generated by sliding.

SUMMARY OF THE INVENTION

A compressor of an embodiment includes a sealed container and a compression mechanism part configured to compress a refrigerant within the sealed container. The refrigerant is an unsaturated refrigerant or a mixed refrigerant containing an unsaturated refrigerant. The compression mechanism part contains chromium. The compression mechanism part includes a first member and a second member. The first member and the second member slide relative to each other. A blend layer containing chromium nitride and titanium nitride is formed on a surface of the first member. A concentration of the titanium nitride in the blend layer is distributed to increase and decrease regularly in a thickness direction of the blend layer. Carbide is precipitated on a surface of the second member.

DETAILED DESCRIPTION OF THE INVENTION

A compressor according to an embodiment includes a compression mechanism part configured to compress a refrigerant within a sealed container.

The compression mechanism part includes a first member and a second member which include chromium and slide relative to each other. A blend layer containing chromium nitride and titanium nitride is formed on a surface of the first member. Carbide is precipitated on a surface of the second member. The titanium nitride in the blend layer is distributed such that a concentration of the titanium nitride increases and decreases regularly in a thickness direction of the blend layer.

As long as the compressor according to the embodiment may be any compressor having these features, any known aspect may be adopted without limitation for configurations other than these features.

The compressor according to the embodiment can be used in, for example, a refrigeration cycle apparatus. One example is a refrigeration cycle apparatus including a compressor according to the embodiment, a condenser serving as a heat radiator connected to the compressor, an expansion device connected to the condenser, and an evaporator serving as a heat absorber connected between the expansion device and the compressor.

The condenser dissipates heat from a high-temperature and high-pressure gaseous refrigerant sent from the compressor, thereby converting the gaseous refrigerant into a high-pressure liquid refrigerant. The expansion device reduces a pressure of the high-pressure liquid refrigerant sent from the condenser, thereby converting the liquid refrigerant into a low-temperature and low-pressure liquid refrigerant. The evaporator vaporizes the low-temperature and low-pressure liquid refrigerant sent from the expansion device, thereby converting the low-temperature and low-pressure liquid refrigerant into a low-pressure gaseous refrigerant. The evaporator absorbs heat of vaporization from the surroundings when the low-pressure liquid refrigerant vaporizes, thereby cooling the surroundings. Note that, the low-pressure gaseous refrigerant that has passed through the evaporator is taken into the compressor. As described above, in the refrigeration cycle apparatus, the refrigerant circulates between the gaseous refrigerant and the liquid refrigerant while changing its phase.

(Compressor)

Figure 1:
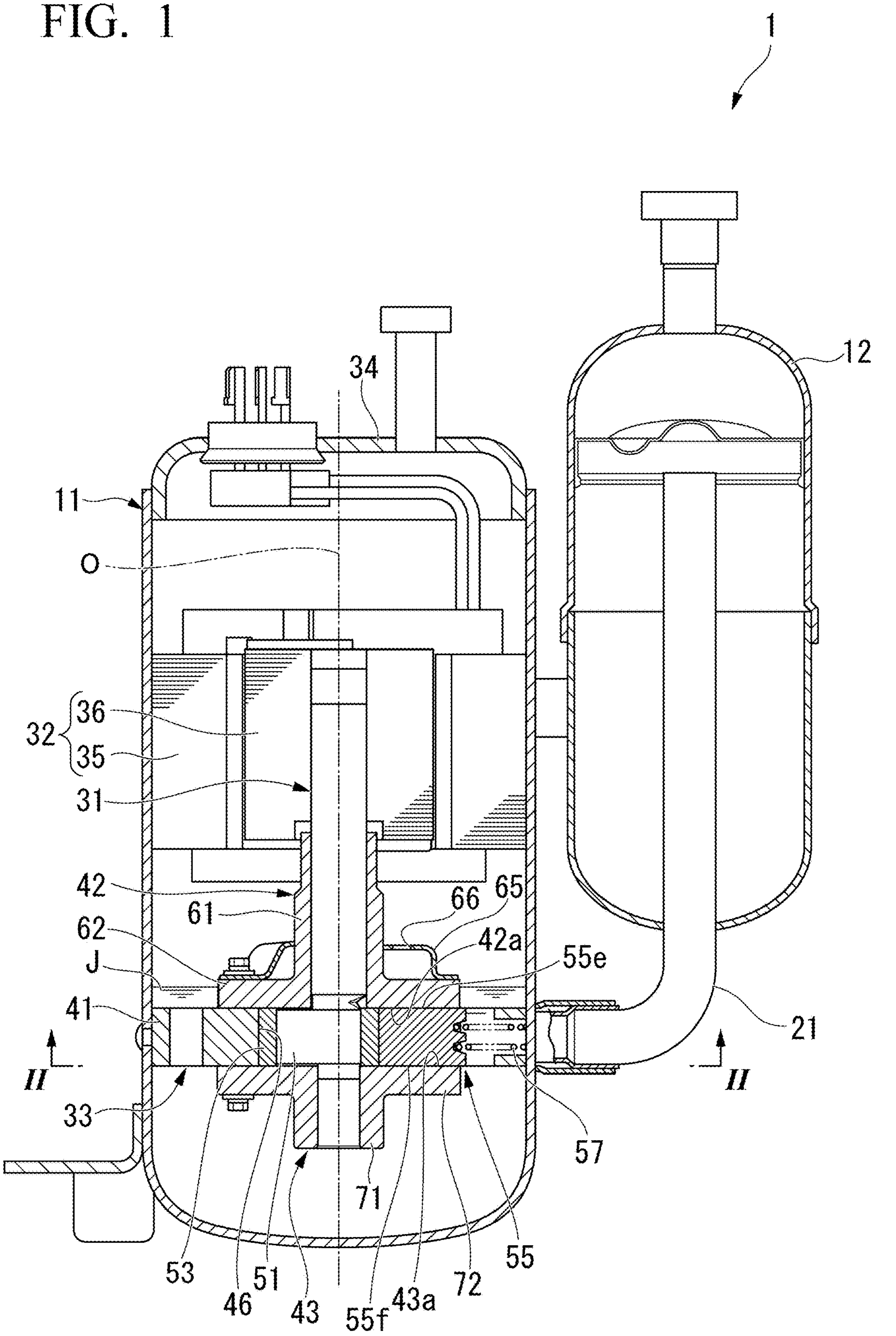
FIG. 1 is a schematic view showing a schematic configuration of a compressor according to an embodiment.

FIG. 1 is a schematic view showing a schematic configuration of a compressor 1 according to an example of the embodiment.

The compressor 1 is a so-called rotary-type compressor (rotary compressor). The compressor 1 takes in a gaseous refrigerant and compresses the gaseous refrigerant into a high-temperature and high-pressure refrigerant. Note that, the compressor of the embodiment is not limited to a rotary type, and may be a compressor of a scroll type, a reciprocating type, a swash plate type, or the like.

The compressor 1 includes a compressor main body 11 and an accumulator 12.

The accumulator 12 is a so-called gas-liquid separator. The accumulator 12 is connected to the compressor main body 11 through a suction pipe 21. The accumulator 12 is connected to an evaporator. The accumulator 12 supplies only vaporized refrigerant from refrigerant vaporized in the evaporator and liquid refrigerant not vaporized in the evaporator to the compressor main body 11.

The compressor main body 11 includes a rotating shaft 31, an electric motor part 32, a compression mechanism part 33, and a sealed container 34. The sealed container 34 houses the rotating shaft 31, the electric motor part 32, and the compression mechanism part 33 therein. The sealed container 34 is formed in a cylindrical shape. Both end portions of the sealed container 34 are closed in a direction along an axis O of the sealed container 34. A refrigeration oil J is contained within the sealed container 34. A part of the compression mechanism part 33 is immersed in the refrigeration oil J.

The rotating shaft 31 is disposed coaxially along the axis O of the sealed container 34. Note that, in the following description, a direction along the axis O will be simply referred to as an axial direction, a direction orthogonal to the axial direction will be referred to as a radial direction, and a direction around the axis O will be referred to as a circumferential direction.

The electric motor part 32 is disposed on a first side in the axial direction within the sealed container 34. The compression mechanism part 33 is disposed on a second side in the axial direction within the sealed container 34. In the following description, a side on the electric motor part 32 in the axial direction is referred to as an upper side, and a side on the compression mechanism part 33 is referred to as a lower side.

The electric motor part 32 is a so-called inner rotor type DC brushless motor. Specifically, the electric motor part 32 includes a stator 35 and a rotor 36. The stator 35 is fixed to an inner wall surface of the sealed container 34 by shrink fitting or the like. The rotor 36 is fixed to an upper part of the rotating shaft 31 with a radial gap between itself and an inner side of the stator 35.

The compression mechanism part 33 includes a cylindrical cylinder 41. The rotating shaft 31 passes through the cylindrical cylinder 41. The compression mechanism part 33 closes both end openings in the axial direction of the cylinder 41. The compression mechanism part 33 includes a main bearing 42 and an auxiliary bearing 43. The auxiliary bearing 43 rotatably supports the rotating shaft 31. A space formed by the cylinder 41, the main bearing 42, and the auxiliary bearing 43 constitutes a cylinder chamber 46.

An eccentric portion 51 is formed on a portion of the rotating shaft 31 that is positioned within the cylinder chamber 46. The eccentric portion 51 is radially eccentric with respect to the axis O.

A roller 53 is fitted over the eccentric portion 51. The roller 53 has an outer circumferential surface 53*a*. The cylinder 41 has an inner circumferential surface 41*a*. The roller 53 is configured to be eccentrically rotatable with respect to the axis O as the rotating shaft 31 rotates. In a state in which the roller 53 rotates, the outer circumferential surface 53*a* of the roller 53 is in sliding contact with the inner circumferential surface 41*a* of the cylinder 41 via a refrigeration oil film.

Figure 2:
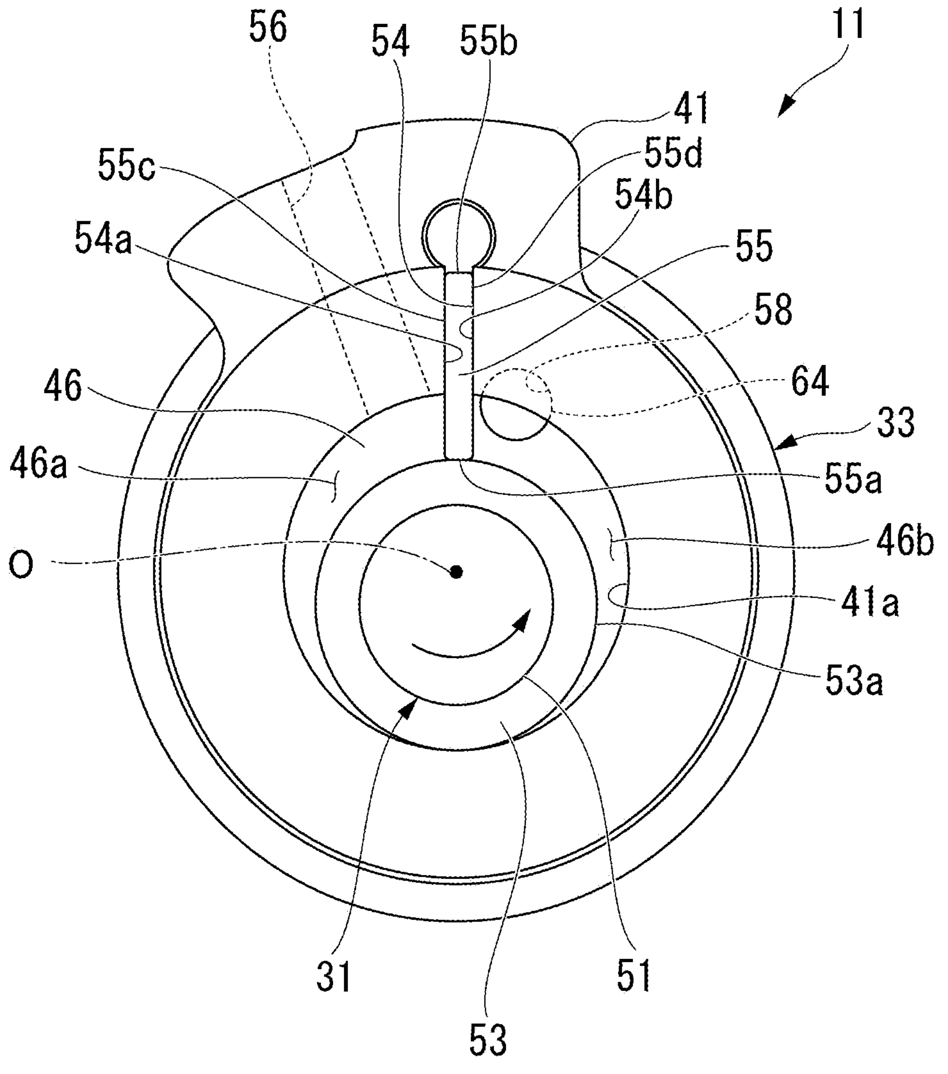
FIG. 2 is a cross-sectional view along line II-II of the compressor shown in FIG. 1.
Figure 3:
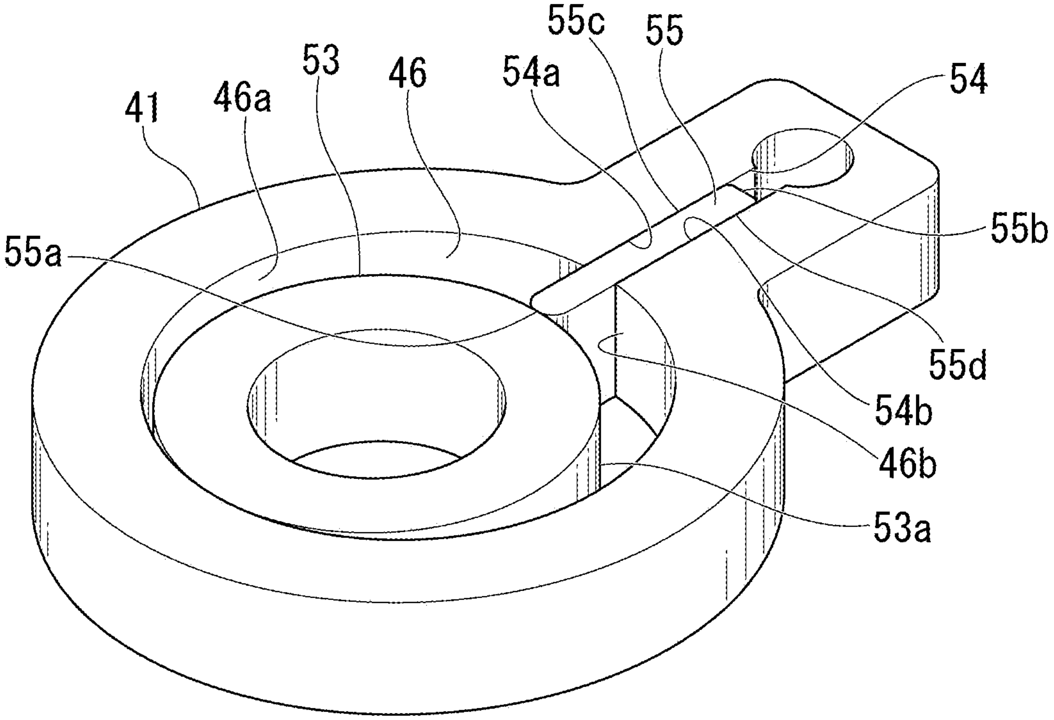
FIG. 3 is a perspective view of a cylinder, a roller, and a blade in the compressor shown in FIG. 1.

As shown in FIGS. 2 and 3, a blade groove 54 recessed outward in the radial direction is formed in a portion of the cylinder 41 in the circumferential direction. The blade groove 54 is formed over the entire axial direction (height direction) of the cylinder 41. The blade groove 54 communicates with the inside of the sealed container 34 at an outer end portion in the radial direction.

A blade 55 is provided in the blade groove 54. The blade 55 is configured to be slidable in the radial direction with respect to the cylinder 41. As shown in FIG. 1, the blade 55 has a back surface 55*b*. The back surface 55*b* of the blade 55 is an outer end surface in the radial direction. The back surface 55*b* is biased inward in the radial direction by a biasing portion 57. As shown in FIGS. 2 and 3, the blade 55 has a distal end surface 55*a*. The distal end surface 55*a* of the blade 55 is an inner end surface in the radial direction. The distal end surface 55*a* is in contact with the outer circumferential surface 53*a* of the roller 53 in the cylinder chamber 46. Therefore, the blade 55 is configured to be able to advance into and retreat from the cylinder chamber 46 in accordance with eccentric rotation of the roller 53. The cylinder chamber 46 is divided into a suction chamber 46*a* and a compression chamber 46*b* by the roller 53 and the blade 55. Note that, in a plan view from the axial direction, the distal end surface 55*a* of the blade 55 is formed in a convex arcuate shape directed inward in the radial direction.

The refrigeration oil J is interposed between the blade 55 and inner surfaces 54*a* and 54*b* of the blade groove 54, between the blade 55 and a lower surface 42*a* of the main bearing 42, and between the blade 55 and an upper surface 43*a* of the auxiliary bearing 43.

A suction hole 56 penetrating the cylinder 41 in the radial direction is formed in a portion of the cylinder 41 that is positioned forward (on a left side of the blade groove 54 in FIG. 2) in a direction of rotation of the roller 53 (refer to the arrow in FIG. 2) with respect to the blade groove 54. An outer end portion of the suction hole 56 in the radial direction is connected to the suction pipe 21 (refer to FIG. 1). An inner end portion of the suction hole 56 in the radial direction opens into the suction chamber 46*a* of the cylinder chamber 46. A discharge groove 58 is formed in a portion of the cylinder 41 positioned on an upstream side of the blade groove 54 (on a right side of the blade groove 54 in FIG. 2) in a direction of rotation of the roller 53. The discharge groove 58 is formed in a semicircular shape in a plan view from the axial direction. The discharge groove 58 opens at least on an upper surface of the cylinder 41.

As shown in FIG. 1, the main bearing 42 closes an upper end opening of the cylinder 41. The main bearing 42 rotatably supports a portion of the rotating shaft 31 that is positioned above the cylinder 41. Specifically, the main bearing 42 includes a cylindrical portion 61 and a flange portion 62. The rotating shaft 31 is inserted through the cylindrical portion 61. The flange portion 62 is provided to protrude outward in the radial direction from a lower end portion of the cylindrical portion 61.

As shown in FIGS. 1 and 2, a discharge hole 64 (refer to FIG. 2) penetrating the flange portion 62 in the axial direction is formed in a part of the flange portion 62 in the circumferential direction. The discharge hole 64 communicates with the inside of the cylinder chamber 46 through the discharge groove 58. Note that, a discharge valve mechanism (not shown in the drawings) is provided to be disposed in the flange portion 62. The discharge valve mechanism opens and closes the discharge hole 64 in response to an increase in pressure within the cylinder chamber 46 (compression chamber 46*b*), and discharges the refrigerant to the outside of the cylinder chamber 46.

A muffler 65 covering the main bearing 42 from above is provided in the main bearing 42. The muffler 65 has a communication hole 66 formed to allow communication between the inside and outside of the muffler 65. The high-temperature and high-pressure gaseous refrigerant discharged through the discharge hole 64 is discharged into the sealed container 34 through the communication hole 66. The auxiliary bearing 43 closes a lower end opening of the cylinder 41. The auxiliary bearing 43 rotatably supports a portion of the rotating shaft 31 positioned below the cylinder 41. Specifically, the auxiliary bearing 43 includes a cylindrical portion 71 and a flange portion 72. The rotating shaft 31 is inserted through the cylindrical portion 71. The flange portion 72 is provided to protrude outward in the radial direction from an upper end portion of the cylindrical portion 71.

In the compressor 2, when power is supplied to the stator 35 of the electric motor part 32, the rotating shaft 31 rotates around the axis O together with the rotor 36. Then, as the rotating shaft 31 rotates, the eccentric portion 51 and the roller 53 rotate eccentrically within the cylinder chamber 46. At this time, the outer circumferential surface 53*a* of the roller 53 is in sliding contact with the inner circumferential surface 41*a* of the cylinder 41 via the refrigeration oil film. Therefore, the gaseous refrigerant is taken into the cylinder chamber 46 through the suction pipe 21. Therefore, the gaseous refrigerant taken into the cylinder chamber 46 is compressed.

Specifically, in the cylinder chamber 46, the gaseous refrigerant is drawn into the suction chamber 46*a* through the suction hole 56, and the gaseous refrigerant previously drawn in through the suction hole 56 is compressed in the compression chamber 46*b*. The compressed gaseous refrigerant is discharged to the outside of the cylinder chamber 46 (into the muffler 65) through the discharge hole 64 of the main bearing 42, and then discharged into the sealed container 34 through the communication hole 66 of the muffler 65. Note that, the gaseous refrigerant discharged into the sealed container 34 is sent to the condenser.

In the compression mechanism part 33 of the compressor 1, the blade 55 and the roller 53 slide relative to each other with the distal end surface 55*a* of the blade 55 and the outer circumferential surface 53*a* of the roller 53 in contact with each other. The blade 55 and the cylinder 41 slide relative to each other with side surfaces 55*c* and 55*d* positioned on both sides of the blade 55 and the inner surfaces 54*a* and 54*b* of the blade groove 54 in contact with each other. The blade 55 and the main bearing 42 slide relative to each other with an upper end surface 55*e* of the blade 55 and the lower surface 42*a* of the main bearing 42 in contact with each other. The blade 55 and the auxiliary bearing 43 slide relative to each other with a lower end surface 55*f* of the blade 55 and the upper surface 43*a* of the auxiliary bearing 43 in contact with each other.

In the following, an example in which the first member is the blade 55 and the second member is the roller 53 will be described. In the rotary-type compressor 1 such as that in the embodiment, a portion in which sliding conditions are severe and heat generation is most likely to occur is a sliding portion between the blade and the roller. Therefore, when the features of the embodiment are applied with the blade 55 as the first member and the roller 53 as the second member, the compressor 1 can be made to have particularly excellent long-term reliability.

Further, the first member may be the blade 55 and the second member may be the cylinder 41. Also, the first member may be the blade 55 and the second member may be the main bearing 42. Also, the first member may be the blade 55 and the second member may be the auxiliary bearing 43. Also, these features may be combined.

The compression mechanism part 33 contains chromium (Cr). In the compression mechanism part 33, Cr is preferably contained in a base material of the first member because Cr is excellent in wear resistance. For example, as a material for a base material of the blade 55, a steel material containing Cr (for example, an SKH material such as SKH51) can be exemplified. As a material for a base material of the roller 53, a special alloy cast iron (monichrome cast iron) in which Mo, Ni, Cr, and the like are added to gray cast iron of FC250 can be exemplified. As a material for base materials of the cylinder 41, the main bearing 42, and the auxiliary bearing 43, gray cast iron such as FC250 can be exemplified.

Figure 4:
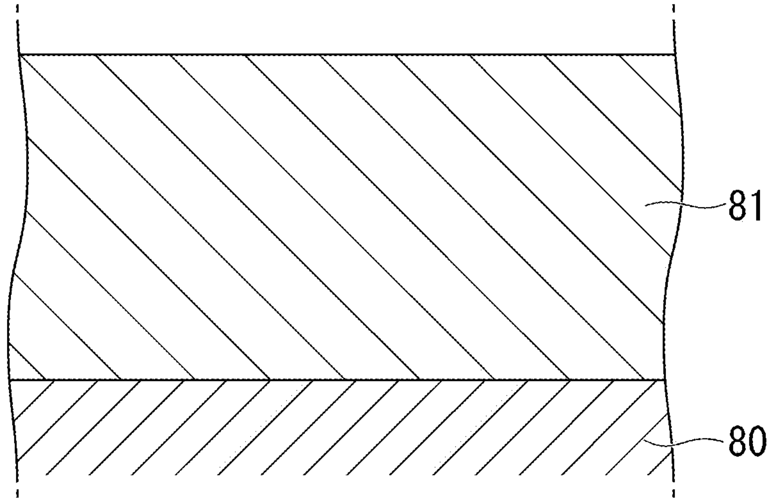
FIG. 4 is an enlarged cross-sectional view showing a distal end surface side of the blade.

In an example shown in FIG. 4, a blend layer 81 containing chromium nitride (CrN) and titanium nitride (TiN) is formed on a surface 80*a* of a base material 80 positioned on the distal end surface 55*a* side of the blade 55 serving as the first member. The base material 80 of the blade 55 contains Cr. Therefore, the base material 80 and the blend layer 81 exhibit excellent adhesion to each other.

The blend layer 81 is a layer containing CrN and TiN. When TiN having high thermal conductivity, together with CrN, is contained in the blend layer 81, heat generated by sliding between the blade 55 serving as the first member and the roller 53 serving as the second member can be efficiently dissipated. As a result, decomposition of the refrigerant due to an excessive temperature rise caused by heat generated through sliding is suppressed. Also, a lattice constant of CrN is 0.41 nm, and a lattice constant of TiN is 0.42 nm. Therefore, the lattice constant of CrN is substantially equal to the lattice constant of TiN. Even when the blend layer 81 contains both of these materials, strain is small, and excellent peel resistance and adhesion can be obtained even in a thick film of 3 μm or more.

The blend layer 81 is preferably a layer formed only of two components, CrN and TiN, because this makes it easier to suppress thermal decomposition of the refrigerant and deterioration in the lubricity of the refrigeration oil. Note that, the blend layer 81 may contain components other than CrN and TiN as necessary as long as effects of the present invention are not impaired.

TiN in the blend layer 81 is distributed such that a concentration of the TiN increases and decreases regularly in a thickness direction of the blend layer 81. When the TiN concentration increases and decreases regularly in the thickness direction of the blend layer 81, efficiency of dissipating heat generated by sliding becomes higher compared to a case in which the TiN concentration remains constant without increasing or decreasing, and therefore the effect of suppressing decomposition of the refrigerant is improved.

In the present invention, "the TiN concentration increases and decreases regularly in the thickness direction of the blend layer" means that, when the TiN concentration in a cross-sectional region perpendicular to the thickness direction of the blend layer is measured while gradually changing a position in the thickness direction of the blend layer from the base material side to a side opposite thereto, the TiN concentration increases and decreases repeatedly, and a pattern of the increase and decrease shows a uniform pattern.

Figure 5:
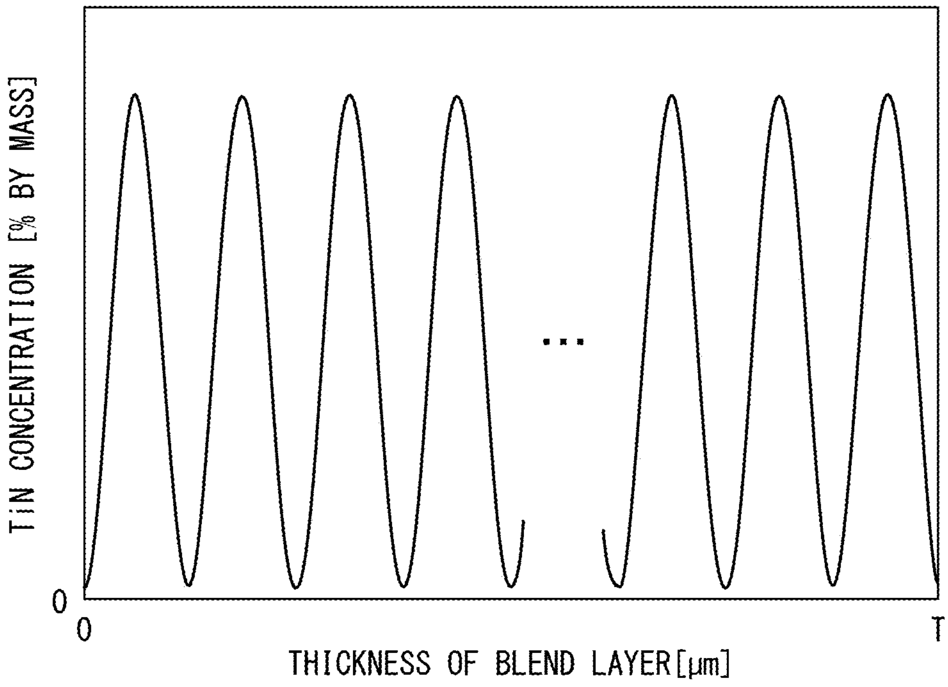
FIG. 5 is a graph showing a blend ratio of TiN in a blend layer, with the horizontal axis representing a thickness of the blend layer and the vertical axis representing a TiN concentration.

As a typical example, as shown in FIG. 5, the TiN concentration in a blend layer having a thickness T (μm) increases and decreases in a uniform wave-like pattern from a zero-thickness position to a position of thickness T (μm).

As shown in FIG. 5, in a graph with the horizontal axis representing a thickness of the blend layer and the vertical axis representing a TiN concentration, the increase and decrease in TiN concentration in the thickness direction of the blend layer is regarded as "regular" when either of the following conditions is satisfied: (1) a difference between upper limit values of the increasing or decreasing TiN concentration is within 10%, (2) a difference between lower limit values thereof is within 10%, or (3) a state in which maximum and minimum peak concentrations of TiN are respectively averaged, and the resulting values fall within a numerical range obtained by tripling a value of "average standard deviation". Also, a case in which a difference in a distance between adjacent peak tops in the thickness direction of the blend layer in the graph is within 0.2 μm is regarded as "regular".

In a graph in which the horizontal axis represents a thickness of the blend layer and the vertical axis represents a TiN concentration, the distance between the peak tops is preferably 0.05 to 0.4 μm, and more preferably 0.2 μm.

The TiN concentration in a cross-sectional region perpendicular to the thickness direction of the blend layer 81 preferably increases and decreases within a range of 0 to 15% by mass in the thickness direction of the blend layer 81. The TiN concentration preferably increases and decreases within a range of 0 to 10% by mass. The TiN concentration more preferably increases and decreases within a range of 0 to 5.0% by mass. When the TiN concentration increases and decreases within the range described above, it becomes easier to obtain the blend layer 81 that has efficiency of dissipating heat generated by sliding, adhesion to the base material 80, and scratch resistance.

The number of repetitions of the increase and decrease in TiN concentration in the thickness direction of the blend layer 81 is not particularly limited, and can be, for example, 5 to 9 times, 10 to 14 times, or 15 to 30 times.

A method for forming the blend layer 81 in which the TiN concentration regularly increases and decreases in the thickness direction is not particularly limited.

A thickness of the blend layer 81 is preferably 1.0 to 6.0 m. If the thickness of the blend layer 81 is the lower limit value (1.0 μm) or more, wear resistance can be ensured even during long-term use. If the thickness of the blend layer 81 is the upper limit value (6.0 μm) or less, peeling due to an increase in internal stress can be prevented. The lower limit value of the thickness of the blend layer 81 is more preferably 3.0 μm or more. The upper limit value of the thickness of the blend layer 81 is more preferably 6.0 μm or less.

Figure 6:
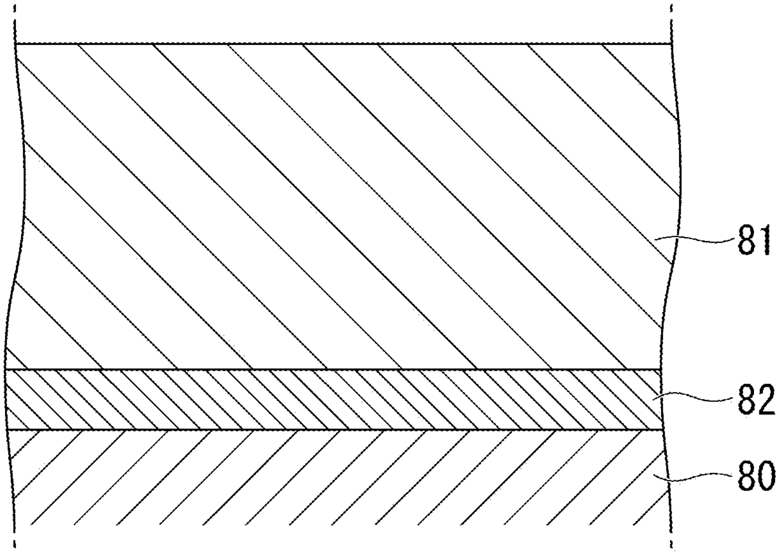
FIG. 6 is an enlarged cross-sectional view showing a distal end surface side of another example of the blade.

As in the example shown in FIG. 6, a CrN layer 82 may be provided between the base material 80 and the blend layer 81. When the CrN layer 82 is provided, adhesion between the base material 80 and the blend layer 81 can be improved.

The CrN layer 82 is preferably a layer formed only of CrN because it has excellent adhesion to the base material 80. Note that, the CrN layer 82 may contain components other than CrN as long as effects of the embodiment are not impaired. Note that, the CrN layer 82 does not contain TiN.

A thickness of a chromium layer 82 is preferably in a range of several nanometers to not more than 1.0 m. If the thickness of the chromium layer 81 is less than or equal to the upper limit value (approximately 1.0 μm), the blend layer 81 is less likely to peel off.

When the chrome layer 82 is provided, a total thickness of the chrome layer 82 and the blend layer 81 is preferably 0.5 to 7.0 m. If the total thickness is greater than or equal to the lower limit value (0.5 μm), wear resistance can be ensured. If the total thickness is less than or equal to the upper limit value (7.0 μm), peeling due to an increase in internal stress can be prevented. The lower limit value of the total thickness is more preferably 1.0 μm or more, and even more preferably 2.0 μm or more. The upper limit value of the total thickness is more preferably 6.0 μm or less, and even more preferably 5.0 μm or less.

Carbide is precipitated on the outer circumferential surface 53*a* of the roller 53 serving as the second member. When hard carbide is precipitated on the surface, wear resistance for the blend layer 81 of the blade 55 serving as the first member can be ensured.

(Refrigerant)

The refrigerant is not particularly limited, and examples thereof include an unsaturated refrigerant and a mixed refrigerant containing an unsaturated refrigerant. An unsaturated refrigerant has poor chemical stability due to double bonds it contains, and tends to undergo refrigerant decomposition due to heat generated by sliding. In the embodiment, even when the unsaturated refrigerant or the mixed refrigerant containing an unsaturated refrigerant is used, decomposition of the refrigerant due to heat generated by sliding can be sufficiently suppressed.

Also, when carbon dioxide is used as the refrigerant, since the compression mechanism part 33 is placed in a high-temperature and high-pressure environment, a viscosity of the refrigeration oil J in the compression mechanism part 33 is likely to decrease due to the temperature, and the lubricity tends to decrease. However, in the embodiment, it is possible to suppress a temperature rise caused by heat generated by sliding between the first member and the second member. Therefore, even when carbon dioxide or a mixed refrigerant containing carbon dioxide is used as the refrigerant, an increase in wear due to the decrease in viscosity of the refrigeration oil J can be suppressed, resulting in excellent reliability.

Also, since a hydrocarbon or a mixed refrigerant containing a hydrocarbon has a lower refrigeration capacity per unit volume compared to conventionally used refrigerants such as HFC410A, it is necessary to increase a refrigerant flow rate to ensure a desired refrigeration capacity. In order to increase the refrigerant flow rate, it is effective to increase the number of compression cycles, but increasing the number of compression cycles causes the compression mechanism part to reach a high temperature, which causes reduction in viscosity of the refrigeration oil J and tends to reduce the lubricity. However, in the embodiment, it is possible to suppress a temperature rise caused by heat generated by sliding between the first member and the second member. Therefore, even when a hydrocarbon or a mixed refrigerant containing a hydrocarbon is used as the refrigerant, an increase in wear due to the decrease in viscosity of the refrigeration oil J can be suppressed, resulting in excellent reliability.

Specific examples of refrigerants include propane, propylene, normal butane, 2-methylbutane, isobutane, refrigerant carbon dioxide gas (R744), HFO1225ye, HFO1233zd, HFO1233yd, HFO1234yf, HFO1234ze, HFO1234ye, and HFO1243zf. One type of the refrigerant may be used alone or two or more types may be used in combination.

(Refrigeration Oil)

The refrigeration oil is not particularly limited, and examples thereof include mineral oil, ester oil, polyol ester oil, polyvinyl ether oil, alkylene glycol oil, and polyalphaolefin oil. One type of the refrigeration oil may be used alone or two or more types may be used in combination.

A phosphorus-containing anti-friction agent may be added to the refrigeration oil. When a phosphorus-containing anti-friction agent is blended into the refrigeration oil, a film made of a reaction product of the anti-friction agent is formed on sliding surfaces of the first member and second member that slide against each other. As a result, solid contact between the sliding members is prevented, and the temperature rise due to heat generated by sliding is further suppressed, thereby making it possible to more efficiently suppress decomposition of the refrigerant.

Specific examples of phosphorus-containing anti-friction agents include tricresyl phosphate (TCP), trithiophenyl phosphate, tri(nonylphenyl)phosphite, triphenyl phosphate, dialkyl hydrogen phosphite, and the like. One type of the anti-friction agent may be used alone or two or more types may be used in combination.

When a phosphorus-containing anti-friction agent is blended into the refrigeration oil, a blending amount of the phosphorus-containing anti-friction agent is preferably 0.01 to 5 parts by mass per 100 parts by mass of the refrigeration oil. As for a lower limit value of the blending amount of the phosphorus-containing anti-friction agent, 0.1 parts by mass or more is more preferable, and 0.5 parts by mass or more is even more preferable. As for an upper limit value of the blending amount of the phosphorus-containing anti-friction agent, 3 parts by mass or less is more preferable, and 1.5 parts by mass or less is even more preferable.

As described above, according to the embodiment, when the blend layer which contains CrN and TiN and in which the TiN concentration regularly increases and decreases in the thickness direction is formed on the surface of the first member, it is possible to reduce heat generated by sliding between the first member and the second member. Therefore, it is possible to suppress thermal decomposition of the refrigerant and deterioration of lubrication performance due to a reduction in viscosity of the lubrication oil. Also, the blend layer formed on the surface of the first member is excellent in adhesion and is not easily peeled off, thereby also obtaining excellent wear resistance. For these reasons, it possible to realize a compressor excellent in reliability over a long period of time.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

EXAMPLES

Hereinafter, the present invention will be specifically described by way of examples, but the present invention is not limited by the following description.

Example 1

In the compressor 1 shown in FIGS. 1 to 3, an experiment was conducted with the blade 55 as the first member and the roller 53 as the second member. SKH51 (hardness HRC63) containing Cr in an amount of 4% by mass was used as the base material 80 of the blade 55. The blend layer 81 containing CrN and TiN and having a thickness of 6.0 μm was formed on the surface 80*a* of the base material 80 positioned on the distal end surface 55*a* side of the blade 55 by PVD processing. In the blend layer 81, the TiN concentration was repeatedly increased and decreased 15 times in a wave-like pattern within a range of 0 to 5% by mass in the thickness direction. A material of the roller 53 serving as the second member was monochromic cast iron (HRC50) containing Cr in an amount of 0.8% by mass. An amount of carbide precipitated on the outer circumferential surface 53*a* of the roller 53 was 4% by mass.

An evaluation test was conducted using the compressor 1 having the blade 55 and roller 53.

R744 (carbon dioxide) was used as the refrigerant, and polyalkylene glycol (PAG) blended with tricresyl phosphate was used as the refrigeration oil. As operating conditions during the test, a set temperature of the refrigeration oil was set to over 130° C. (approximately 130 to 150° C.), a suction pressure was set to 3.0 MPa, and a discharge pressure was set to 12.0 MPa. Under the above-described configurations and conditions, the compressor 1 was operated for 2000 hours, and an amount of wear of the blade after the test was evaluated based on the following criteria.

<Evaluation Criteria>

"Good": An amount of wear of blade is 1 μm or less.

"Bad": An amount of wear of blade is greater than 1 μm.

Comparative Example 1

A compressor having the same configuration as in example 1, except that a diamond-like carbon (DLC) layer with a thickness of 2 μm was formed on the surface 80*a* of the base material 80 positioned on the distal end surface 55*a* side of the blade 55 instead of the blend layer 81, was manufactured and evaluated in the same manner as in example 1.

Reference Example 1

A compressor having the same configuration as in comparative example 1 was manufactured and evaluated in the same manner as in example 1 except that the set temperature of the refrigeration oil in the evaluation test was changed to less than 130° C. (about 110 to 130° C.).

Evaluation results of example 1, comparative example 1 and reference example 1 are shown in Table 1.

TABLE 1

| | First member (blade) | Second member (roller) | Refrigeration oil | Oil temperature | Evaluation on wear resistance |
|---|---|---|---|---|---|
| Example | Blend layer | Monichrome cast iron | PAG | >130° C. | Good |
| Comparative example 1 | DLC layer | Monichrome cast iron | PAG | >130° C. | Bad |
| Reference example 1 | DLC layer | Monichrome cast iron | PAG | <130° C. | Good |

As shown in Table 1, the compressor of comparative example 1 in which the DLC layer was formed on the surface of the blade exhibited greater blade wear compared to that in reference example 1 in which the oil temperature was set to less than 130° C. In contrast, in the compressor of example 1 in which the blend layer was formed on the surface of the blade, wear of both the blade and roller was suppressed.

What is claimed is:

1. A compressor comprising:

a sealed container; and a compression mechanism part configured to compress a refrigerant within the sealed container, wherein the refrigerant is an unsaturated refrigerant or a mixed refrigerant containing an unsaturated refrigerant, the compression mechanism part contains chromium, the compression mechanism part includes a first member and a second member, the first member and the second member slide relative to each other, a blend layer containing chromium nitride and titanium nitride is formed on a surface of the first member, the titanium nitride in the blend layer is distributed such that a concentration of the titanium nitride increases and decreases regularly in a thickness direction of the blend layer, and carbide is precipitated on a surface of the second member.

2. The compressor according to claim 1, wherein a concentration of the titanium nitride in a cross-sectional region perpendicular to the thickness direction of the blend layer increases and decreases in a range of 0 to 5.0% by mass in the thickness direction of the blend layer.

3. The compressor according to claim 1, wherein a refrigeration oil having a phosphorus-containing anti-wear agent blended therein is contained within the sealed container.

4. The compressor according to claim 1, being a rotary compressor, the rotary compressor including:

a blade serving as the first member; and a roller serving as the second member.

5. A compressor comprising:

a sealed container; and a compression mechanism part configured to compress a refrigerant within the sealed container, wherein the refrigerant is carbon dioxide or a mixed refrigerant containing carbon dioxide, the compression mechanism part contains chromium, the compression mechanism part includes a first member and a second member, the first member and the second member slide relative to each other, a blend layer containing chromium nitride and titanium nitride is formed on a surface of the first member, the titanium nitride in the blend layer is distributed such that a concentration of the titanium nitride increases and decreases regularly in a thickness direction of the blend layer, and carbide is precipitated on a surface of the second member.

6. The compressor according to claim 5, wherein a concentration of the titanium nitride in a cross-sectional region perpendicular to the thickness direction of the blend layer increases and decreases in a range of 0 to 5.0% by mass in the thickness direction of the blend layer.

7. The compressor according to claim 5, wherein a refrigeration oil having a phosphorus-containing anti-wear agent blended therein is contained within the sealed container.

8. The compressor according to claim 5, being a rotary compressor, the rotary compressor including:

a blade serving as the first member; and a roller serving as the second member.

9. A compressor comprising:

a sealed container; and a compression mechanism part configured to compress a refrigerant within the sealed container, wherein the refrigerant is a hydrocarbon or a mixed refrigerant containing a hydrocarbon, the compression mechanism part contains chromium, the compression mechanism part includes a first member and a second member, the first member and the second member slide relative to each other, a blend layer containing chromium nitride and titanium nitride is formed on a surface of the first member, the titanium nitride in the blend layer is distributed such that a concentration of the titanium nitride increases and decreases regularly in a thickness direction of the blend layer, and carbide is precipitated on a surface of the second member.

10. The compressor according to claim 9, wherein a concentration of the titanium nitride in a cross-sectional region perpendicular to the thickness direction of the blend layer increases and decreases in a range of 0 to 5.0% by mass in the thickness direction of the blend layer.

11. The compressor according to claim 9, wherein a refrigeration oil having a phosphorus-containing anti-wear agent blended therein is contained within the sealed container.

12. The compressor according to claim 9, being a rotary compressor, the rotary compressor including:

a blade serving as the first member; and a roller serving as the second member.

* * * * *